Figure 9:
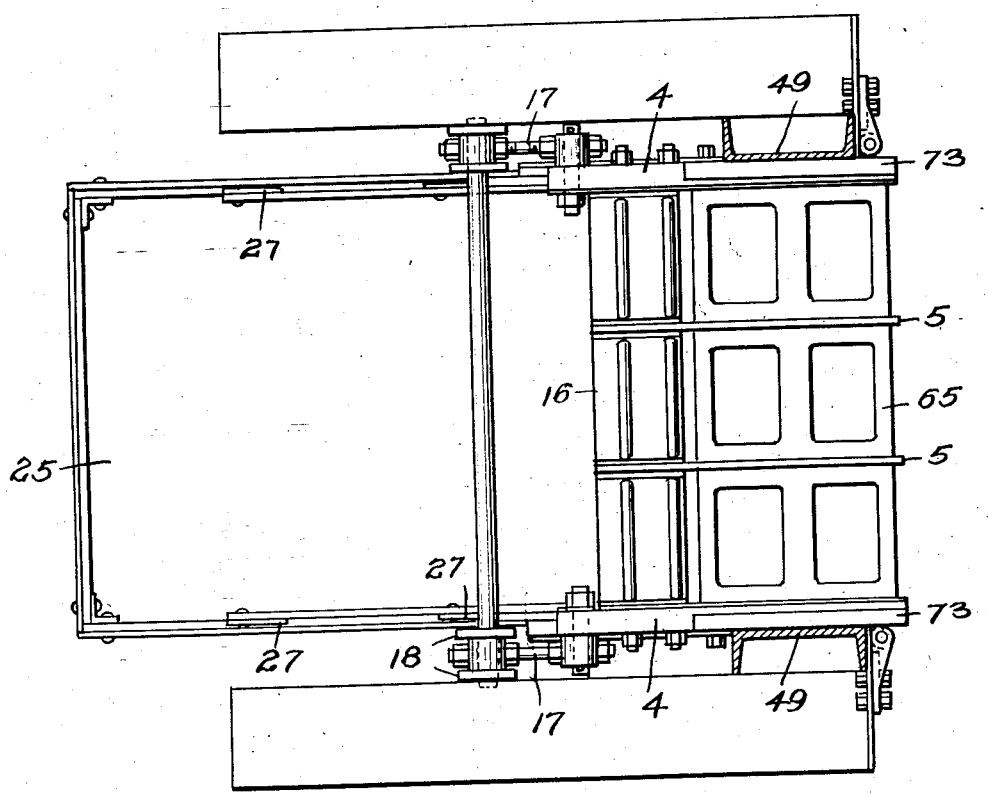

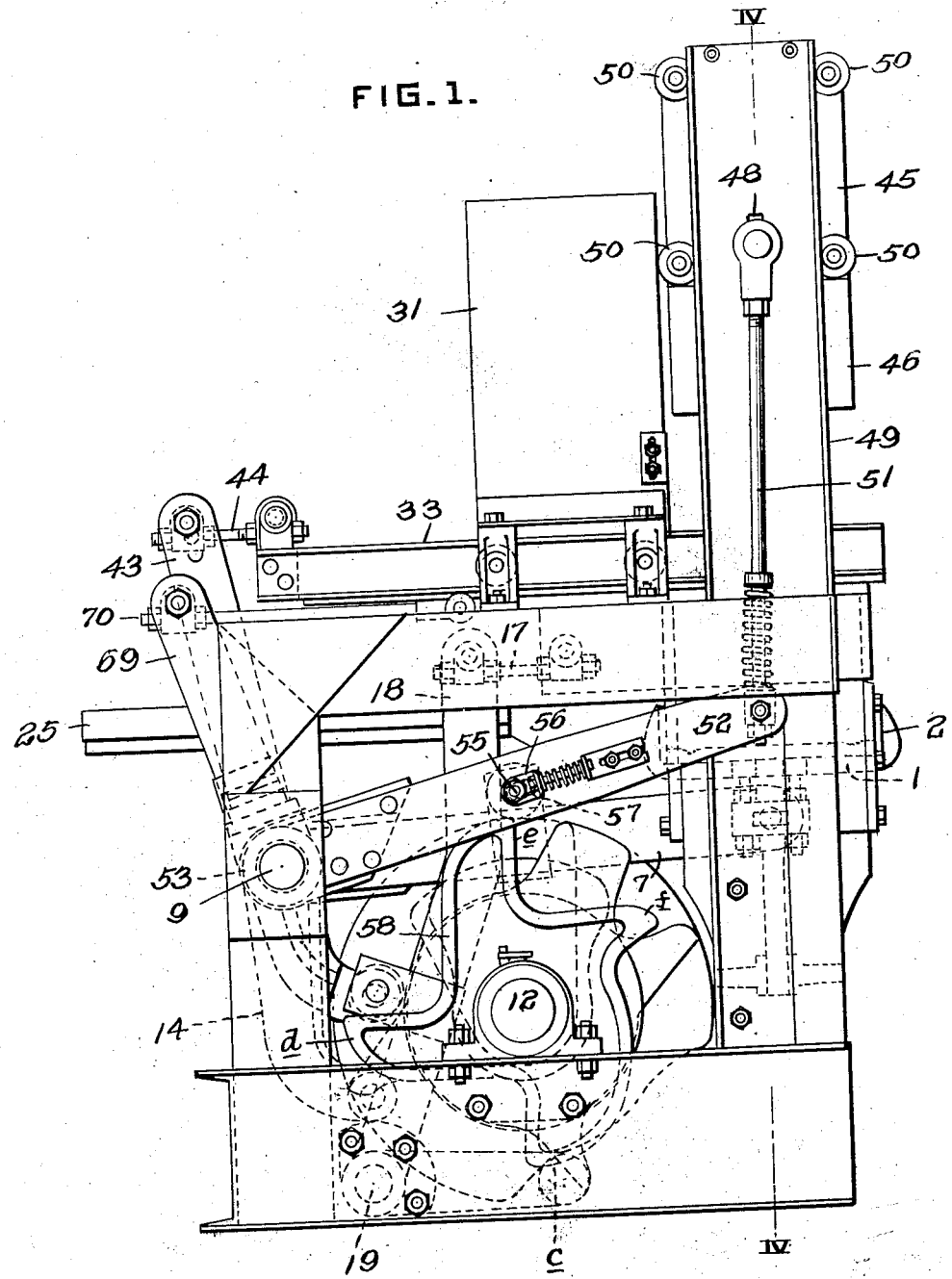

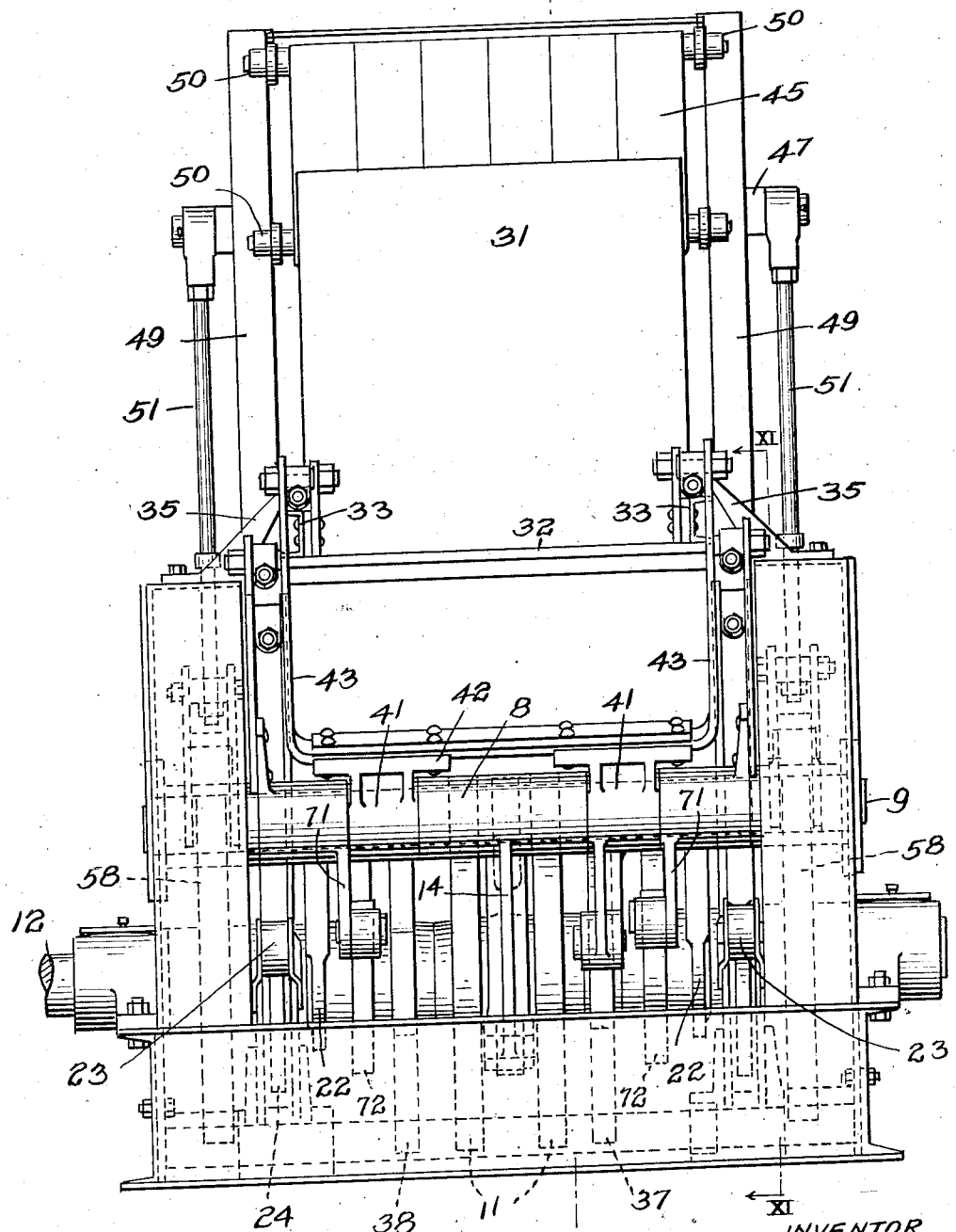

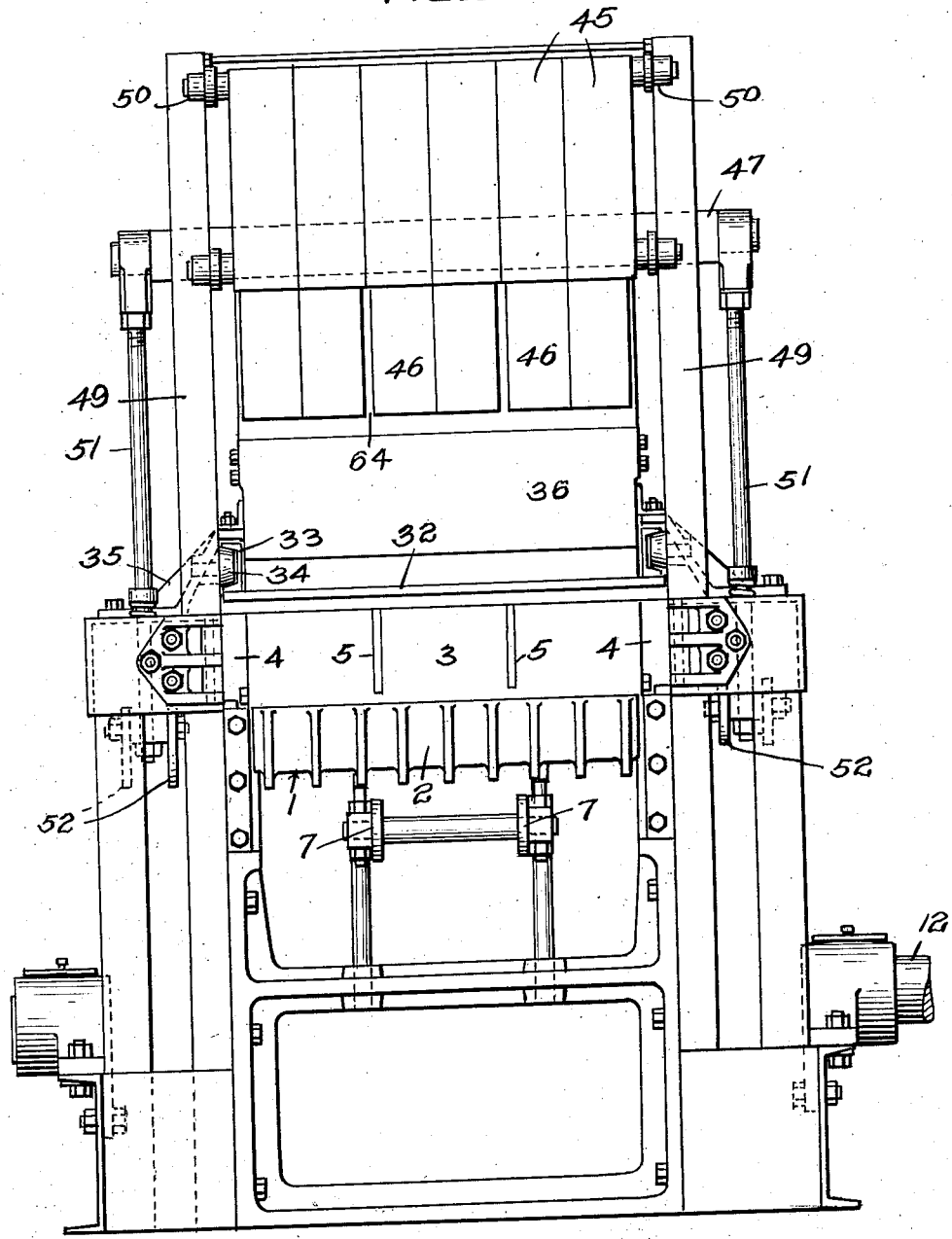

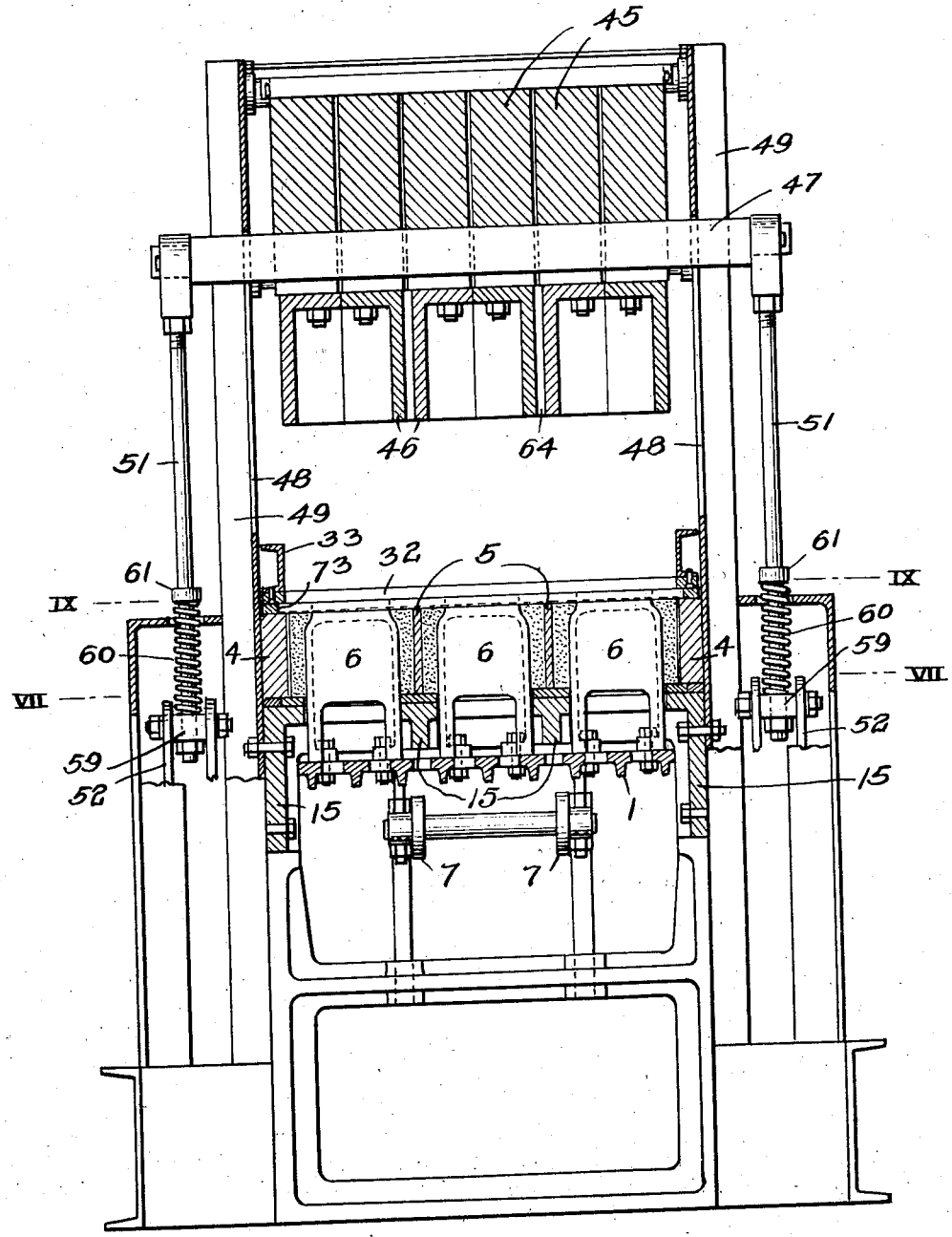

July 7, 1925.  
S. H. WIGHTMAN ET AL  
1,545,023
MANUFACTURE OF TILE, BRICKS, ETC
Filed July 10, 1922  16 Sheets-Sheet 5
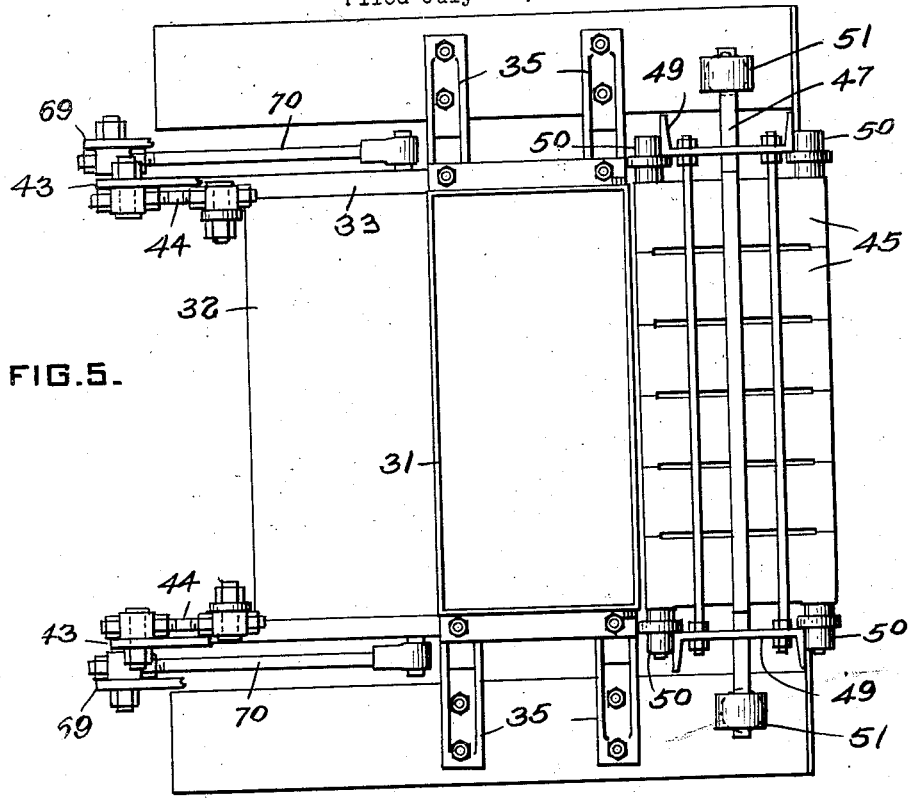
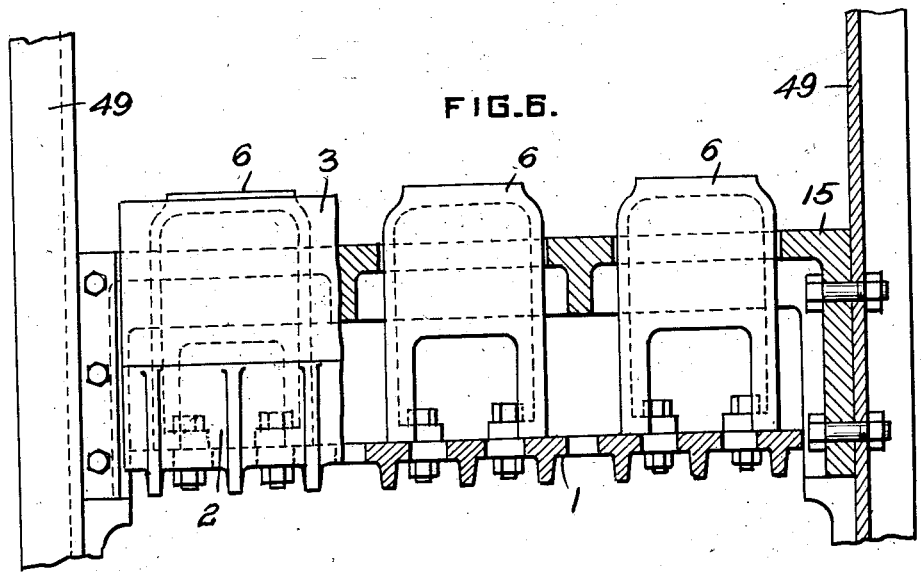
WITNESSES  
J. Herbert Bradley
INVENTOR  
Sherburne H. Wightman  
and Thomas A. Long  
by Darwin E. Wolcott  
Atty July 7, 1925.
S. H. WIGHTMAN ET AL
1,545,023
MANUFACTURE OF TILE, BRICKS, ETC
Filed July 10, 1922
16 Sheets-Sheet 6
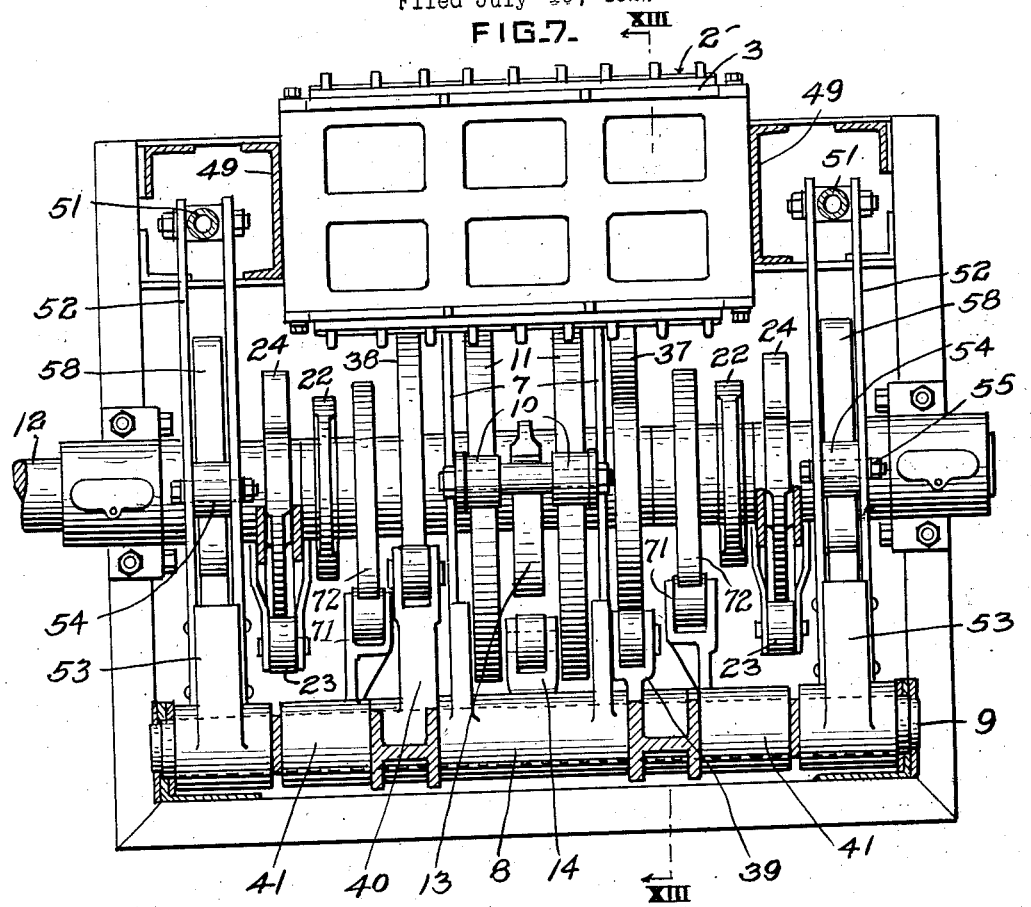
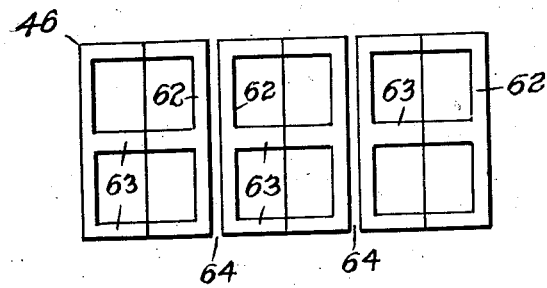
WITNESSES
INVENTOR

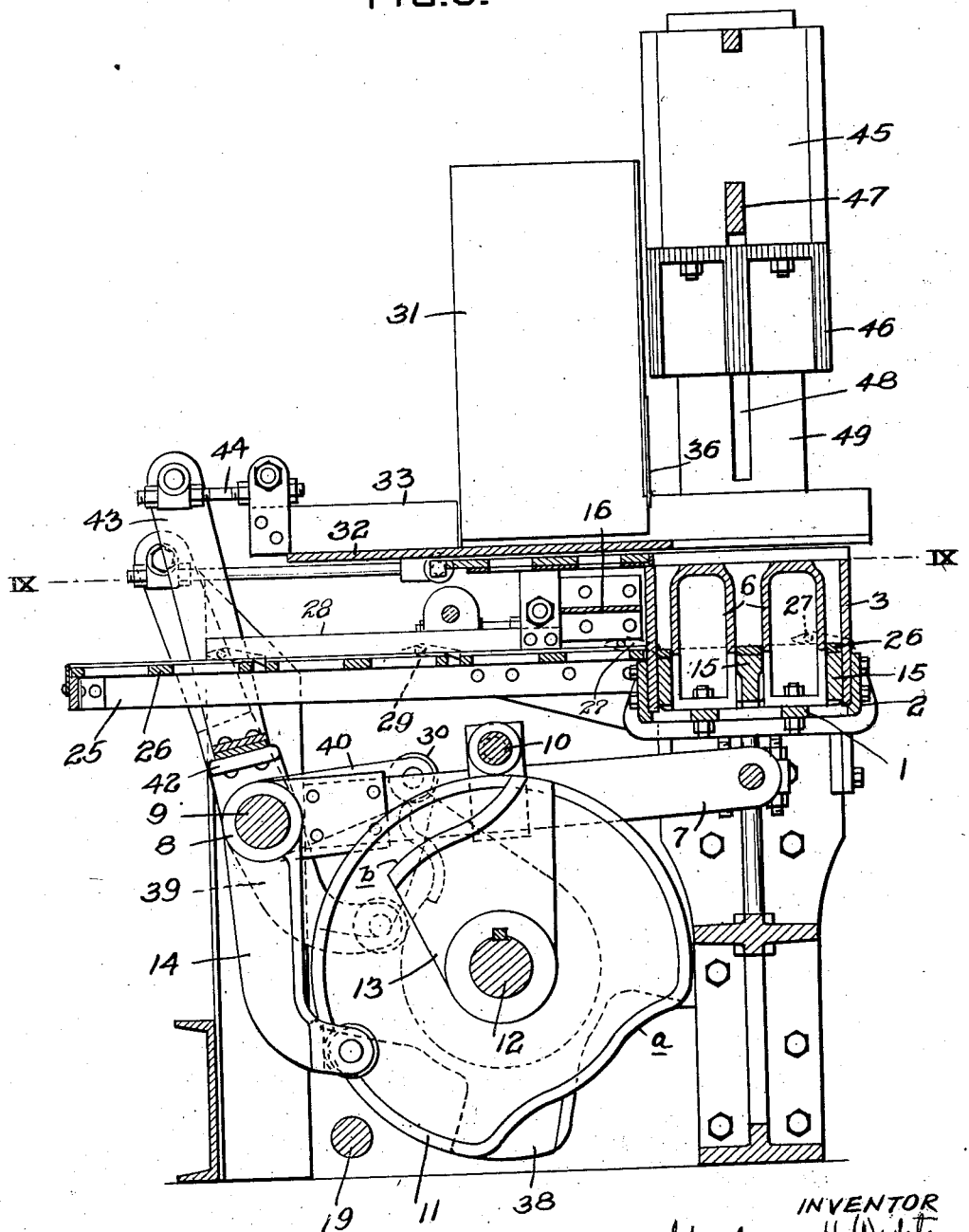

July 7, 1925.

S. H. WIGHTMAN ET AL

MANUFACTURE OF TILE, BRICKS, ETC

Filed July 10, 1922   16 Sheets-Sheet 8

1,545,023

WITNESSES

INVENTOR

July 7, 1925.　　　S. H. WIGHTMAN ET AL　　　1,545,023
MANUFACTURE OF TILE, BRICKS, ETC
Filed July 10, 1922　　16 Sheets-Sheet 9

WITNESSES
J. Hebert Bradley

INVENTOR
Sherburne H. Wightman
Thomas A. Long
by Darwin S. Wolcott
Atty.

July 7, 1925.  1,545,023
S. H. WIGHTMAN ET AL
MANUFACTURE OF TILE, BRICKS, ETC
Filed July 10, 1922  16 Sheets-Sheet 10
FIG.13.
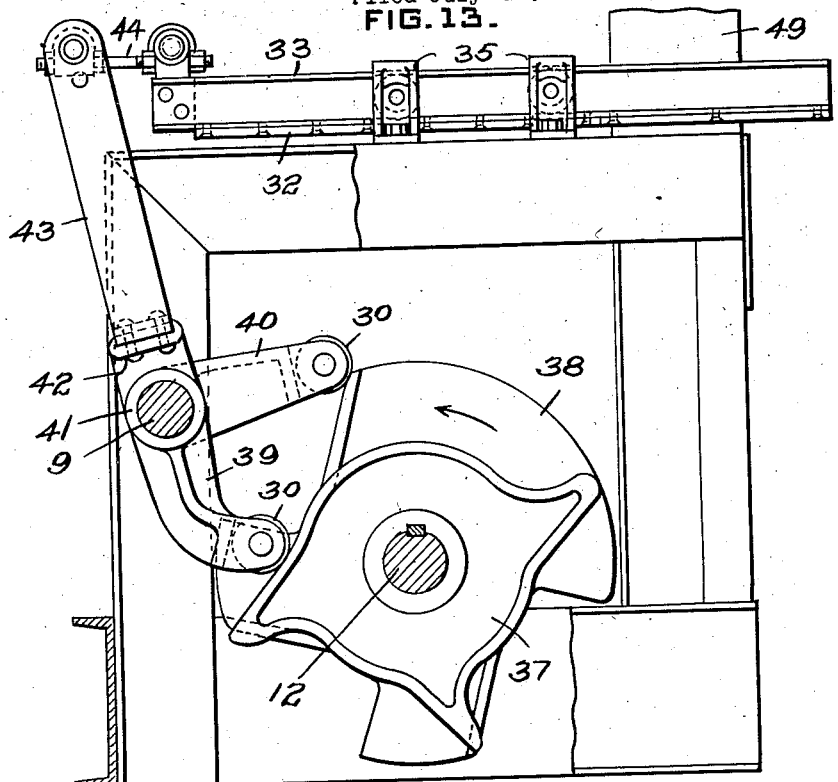
FIG.14.
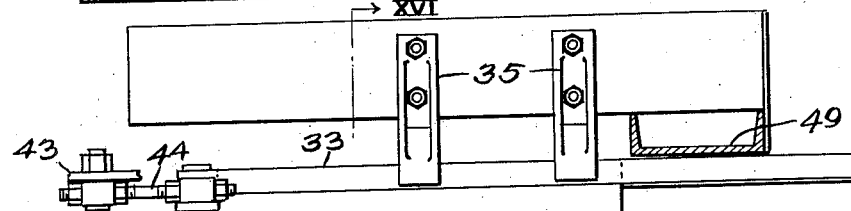
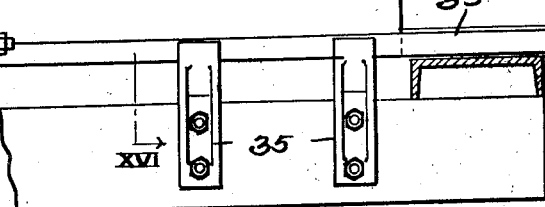
INVENTOR July 7, 1925.　　　S. H. WIGHTMAN ET AL　　　1,545,023
MANUFACTURE OF TILE, BRICKS, ETC
Filed July 10, 1922　　　16 Sheets-Sheet 11

WITNESSES　　　　　　　　　　　　　INVENTOR

July 7, 1925.  1,545,023
S. H. WIGHTMAN ET AL
MANUFACTURE OF TILE, BRICKS, ETC
Filed July 10, 1922  16 Sheets-Sheet 12

WITNESSES  INVENTOR

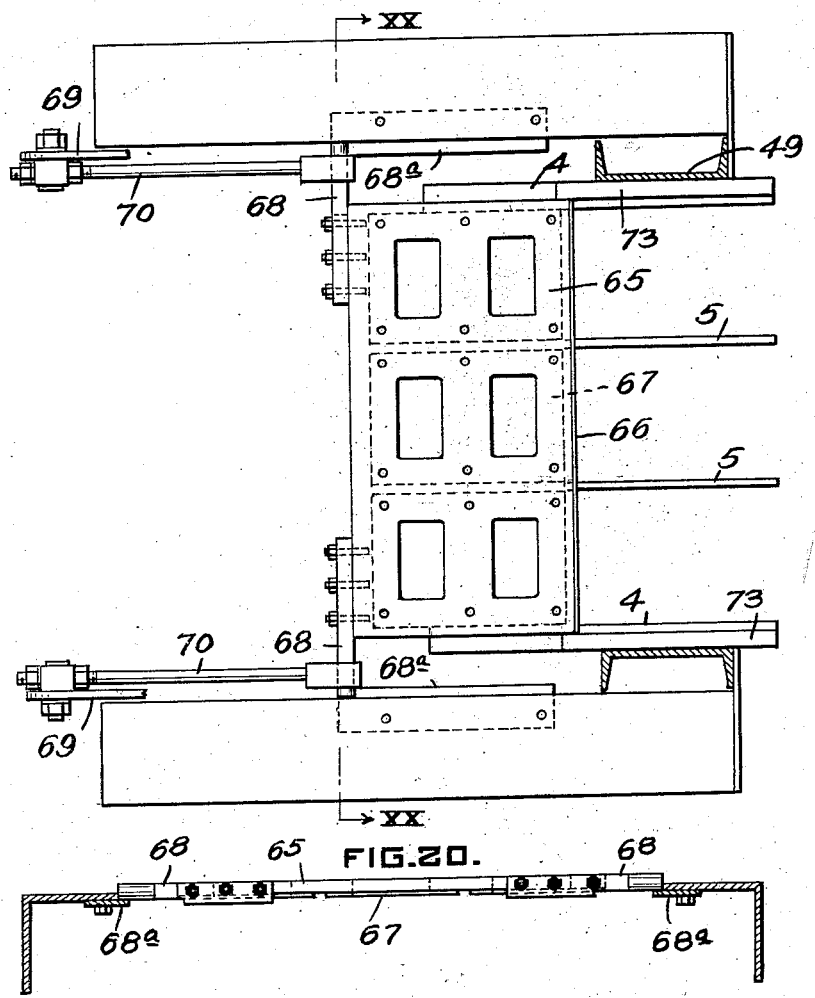

July 7, 1925.  1,545,023
S. H. WIGHTMAN ET AL
MANUFACTURE OF TILE, BRICKS, ETC
Filed July 10, 1922   16 Sheets-Sheet 14

WITNESSES
J. Herbert Bradley

INVENTOR
Sherburne H. Wightman
J. Thomas A. Long
by Darius S. Wolcott
atty

July 7, 1925.

S. H. WIGHTMAN ET AL 1,545,023

MANUFACTURE OF TILE, BRICKS, ETC

Filed July 10, 1922

16 Sheets-Sheet 15

WITNESSES
J. Hebert Bradley.

INVENTOR
Sherburne H. Wightman
and Thomas A. Long
by Darwin S. Wolcott
Atty

July 7, 1925.

S. H. WIGHTMAN ET AL

MANUFACTURE OF TILE, BRICKS, ETC

Filed July 10, 1922 16 Sheets-Sheet 16

1,545,023

Patented July 7, 1925.

1,545,023

UNITED STATES PATENT OFFICE.

SHERBURNE H. WIGHTMAN, OF CHICAGO, ILLINOIS, AND THOMAS A. LONG, OF DETROIT, MICHIGAN, ASSIGNORS, BY MESNE ASSIGNMENTS, TO INTERNATIONAL CONCRETE CORPORATION, OF WILMINGTON, DELAWARE, A CORPORATION OF DELAWARE.

MANUFACTURE OF TILE, BRICKS, ETC.

Application filed July 10, 1922. Serial No. 573,874.

*To all whom it may concern:*

Be it known that we, SHERBURNE H. WIGHTMAN and THOMAS A. LONG, residing, respectively, at Chicago, in the county of Cook and State of Illinois, and Detroit, in the county of Wayne and State of Michigan, both citizens of the United States, have invented or discovered certain new and useful Improvements in the Manufacture of Tile, Bricks, Etc., of which improvements the following is a specification.

The invention described herein relates to mechanism for the formation of tiles from concrete or other suitable material and has for its object the feeding of the material to the mold, the tamping of each increment so fed, the finishing of the upper surface of the article, the stripping of the mold from the completed tile and the discharge of such tile from the machine, the several operations being effected during one revolution of the power shaft, by which the movements of all the parts are effected. The invention is hereinafter more fully described and claimed.

Figure 10:
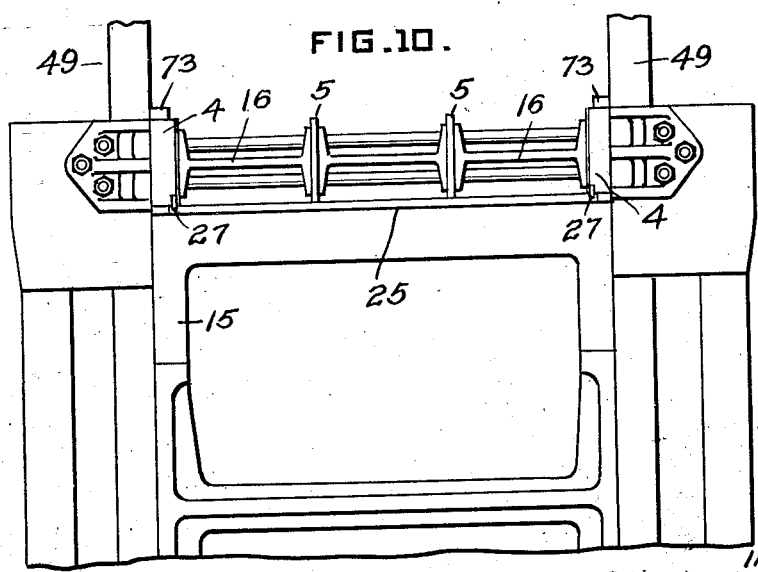
Figure 11:
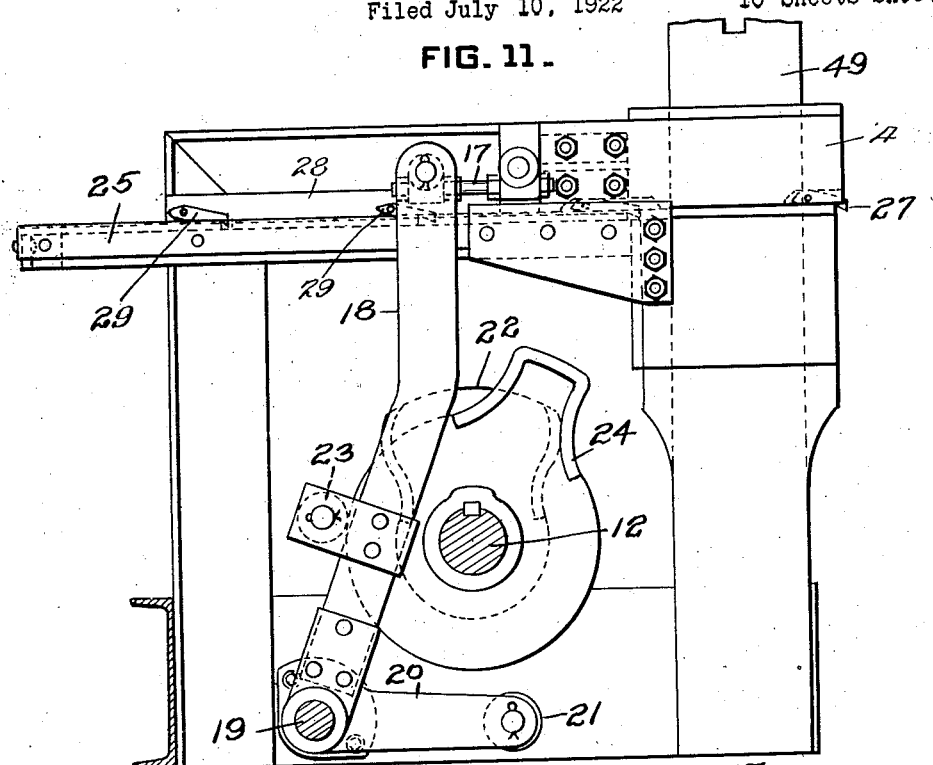
Figure 12:
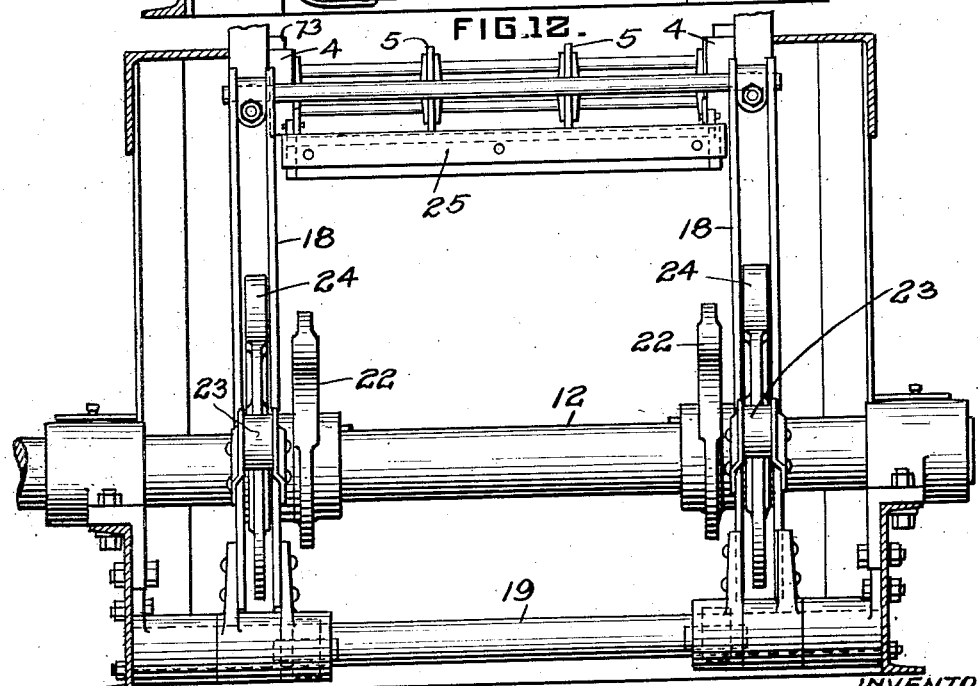
Figure 15:
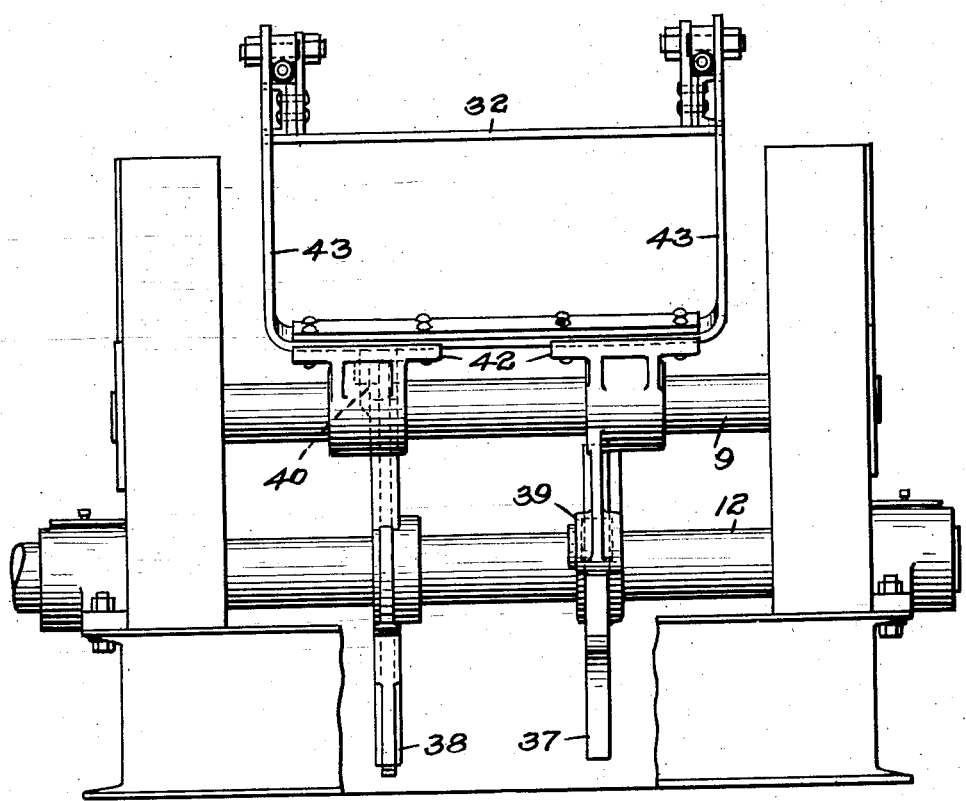
Figure 16:
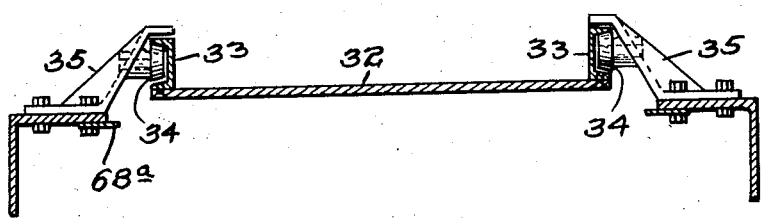
Figure 17:
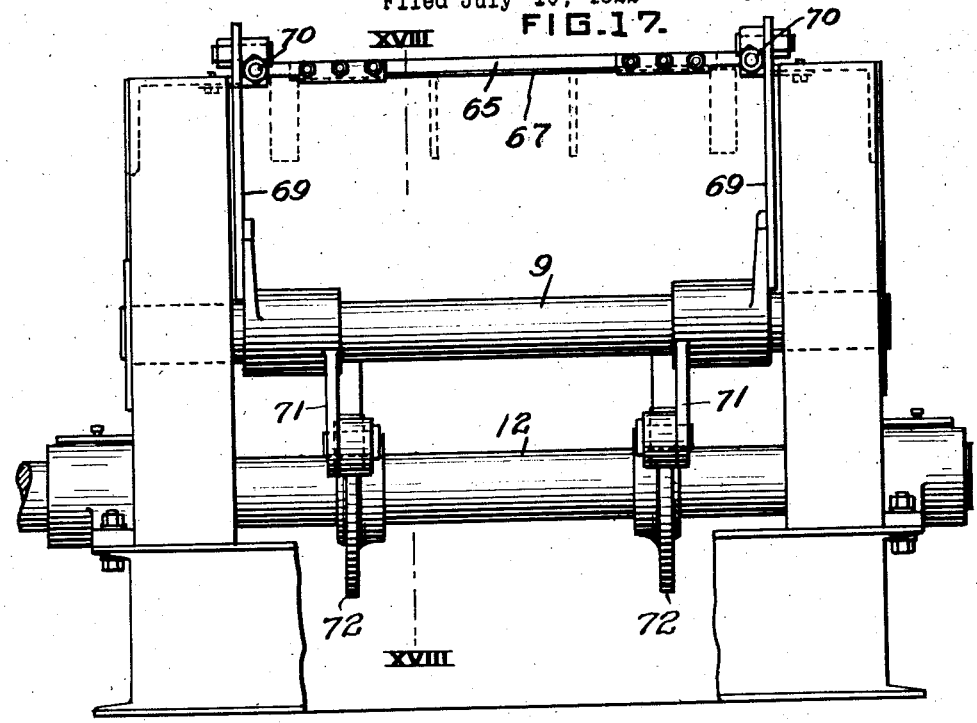
Figure 18:
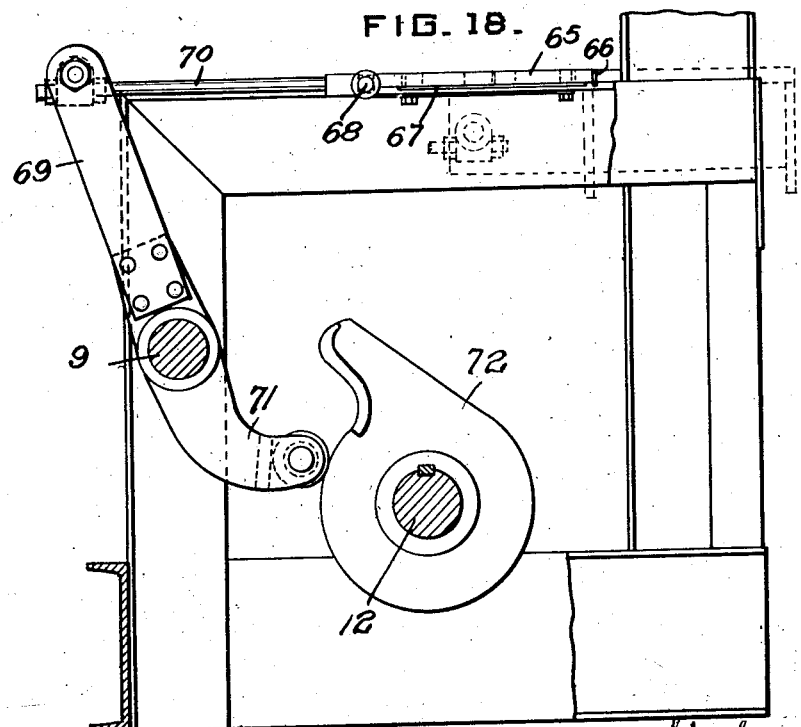

In the accompanying drawings forming a part of this specification, Fig. 1 is a side elevation of a machine embodying the improvements claimed herein; Figs. 2 and 3 are rear and front elevations respectively of the machine; Fig. 4 is a sectional elevation on a plane indicated by the line IV—IV, Fig. 1; Fig. 5 is a top plan view of the machine; Fig. 6 is a view partly in elevation and partly in section showing the mold box and anvil; Fig. 7 is a sectional plan view on a plane indicated by the line VII—VII, Fig. 4; Fig. 8 is a sectional elevation on a plane indicated by the line VIII—VIII, Fig. 2; Fig. 9 is a sectional plan view on a plane indicated by the line IX—IX, Fig. 4; Fig. 10 is an end elevation looking at the left hand end of Fig. 9; Fig. 11 is a sectional elevation on a plane indicated by the line XI—XI, Fig. 2; Fig. 12 is an elevation of the portion of the machine shown in Fig. 11; Fig. 13 is a sectional elevation on a plane indicated by the line XIII—XIII, Fig. 7; Fig. 14 is a plan view and Fig. 15 an elevation of the portion of the machine shown in Fig. 13; Fig. 16 is a sectional detail view, the plane of section being indicated by the line XVI—XVI, Fig. 14; Fig. 17 is an elevation showing the finishing plate and its operating devices; Fig. 18 is a sectional elevation on a plane indicated by the line XVIII—XVIII, Fig. 17; Fig. 19 is a top plan view of the portions of the machine shown in Figs. 17 and 18; Fig. 20 is a sectional detail view on a plane indicated by the line XX—XX, Fig. 19; Fig. 20$^a$ is a plan view of the underside of the finishing plate; and Figs. 21 to 30 are views illustrating the portions of the parts directly operative on the material at successive stages of the operation; and Fig. 31 is a plan view of the shoes carried by the tamping blocks.

In the practice of the invention the mold box in which the material is shaped consists of a bottom plate 1 having flanges 2 to which are secured the side plates 3. This mold which is made of a length and width dependent on the dimensions and number of tiles to be shaped in one operation of the machine, has its ends formed by longitudinally movable end plates 4 and is divided into compartments or shaping chambers by partitions 5 intermediate the partitions 4 and movable therewith as hereinafter described. When hollow tiles are to be formed, cores 6 are arranged in the compartments, said cores being secured to the bottom plate 1. The mold is connected as shown in Figs. 1, 3, 4, and 8 to the outer ends of arms 7 secured to a sleeve 8 (see Fig. 2) loosely mounted on a shaft 9 having its ends secured in the sides of the frame of the machine. The arms carry rollers 10 arranged in the planes of revolution of a pair of cams 11 secured to the power shaft 12, and adapted to raise the sides, bottom and cores of the mold to the position where the material is fed and tamped. The downward movement or stripping of the elements is effected by a cam 13 on the power shaft engaging and shifting an arm 14 on the sleeve 8. It will be observed that the portions $a$ and $b$ of the cams 11 and 13 are so shaped that the mold box will, at the biginning of the stripping operation, be given a short initial movement for the purpose of loosening the grip of the material on the partitions which are then withdrawn as hereinafter described, whereupon the downward or stripping movement of the mold is completed.

Before the mold box is raised, the end and partition plates 4 and 5 are moved forward. The end plates 4 are supported by the anvil 15 extending across the machine and having its ends secured to the sides of the frame of the machine (see Fig. 4) and the partitions 5 are secured to the end plates and to each other by spacing pieces 16 preferably consisting of sections of I-beams (see Figs. 9 and 10). The end plates 4 are connected by links 17 to the upper ends of a pair of levers 18 pivotally mounted on a shaft 19 and provided with angular extensions 20 on their lower ends, said extensions having mounted thereon a roller 21 lying in the plane of rotation of cams 22 on the power shaft 12 (see Figs. 10, 11, and 12). By the operation of their cams the end plates and partitions are moved forward to operative positions. In order to effect a withdrawal of the end plates and partitions, rollers 23 are mounted on the levers 18 so as to be in the plane of rotation of cams 24 on the power shaft. In order to feed pallets to position above the mold box or onto the anvil block, the end plates are provided with dogs 27 pivotally mounted in recesses in the undersides of the end plates. The pallets 26 are supported upon a platform 25 (shown in Figs. 8 and 9) which extends a suitable distance rearwardly of the mold box and is so supported with relation to the level of the anvil block at the lower edges of the end plates, that the latter will move freely over the pallets resting on the platform without disturbing the pallets except when the pallets are engaged by the dogs. There are two pairs of the dogs on the end plates so arranged relative to the movement of the end plates and the widths of the pallets that when the end plates are moved to position across the ends of the molds, the first pair of dogs will engage the rear edge of a pallet on which tiles have been shaped and the other pair will engage the rear edge of an adjacent pallet on the platform, so that when the end plates are moved forward, a loaded pallet will be pushed from the machine and another pallet moved into proper position to enter the mold. When in operative position the pallets are supported by the anvil 15. In practice the platform 25 will be made sufficiently long to hold four or more pallets, and in order to move the pallets successively to a position where the rear pair of dogs 27 will engage them, rearwardly extending bars 28 are secured to the end plates 4 and on these bars are mounted dogs 29 for shifting the pallets along the platform.

After the end plates 4, partitions 5, and pallet have been moved forward to operative position, the mold is raised, the partitions passing into vertical slots in the side plates 3 and the cores projecting through openings in the anvil and pallet. The anvil is so secured in the machine that the ends of the mold box will, when raised, pass along opposite sides of the anvil as shown in Figs. 4, 6 and 7.

After the end plates 4, partitions 5 and pallet have been moved forward, the mold box is raised to position for the reception of the material from the hopper 31. The bottom of the hopper is formed by a slidable plate 32 having its side walls formed by channels 33, and supported and guided in its movements by rollers 34 mounted on brackets 35 and extending into the channels as shown in Figs. 13, 15 and 16.

Figure 21:
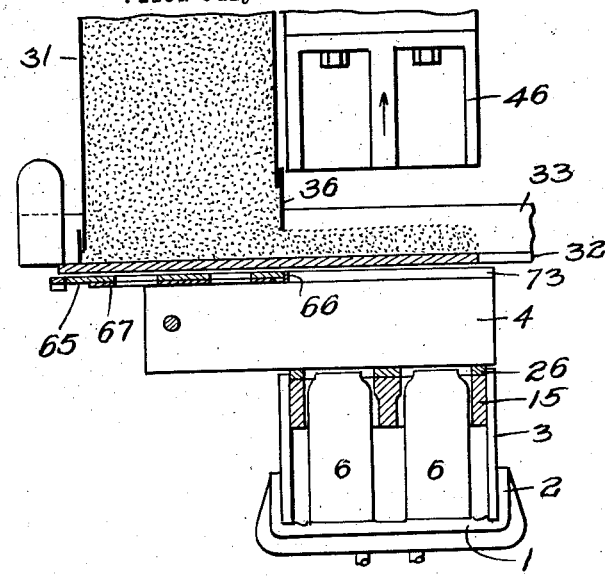

As shown in Fig. 8 the front wall of the hopper does not extend to the feed plate 32 and through the gap thus formed the material is drawn from the hopper as the feed plates moves forward, the thickness of the layer distributed along the plate being regulable by means of an adjustable gate 36. The forward movement, during which a layer of the material is distributed on the plate and the mold box raised, is such that its front end will be approximately in the plane of the front side wall of the mold, as shown in Fig. 21. As the plate is moved rearwardly, the material is pushed off the front end of the plate and distributed uniformly on the platen. The movements of this feed plate are effected by cams 37 and 38 on the power shaft 12 (see Figs. 2, 7, 13 and 15). The cams engage respectively rollers 30 on arms 39 and 40 on hubs 41 loosely mounted on the shaft 9, and provided with seats 42 to which is bolted the yoke 43, said yoke being connected by links 44 to the channels 33 of the feed plate.

In the construction shown herein the material is fed to the mold in three equal portions or increments and the cams are designed to effect three forward and backward movements of the plate and to permit a rest between each backward and forward movement, two of such rests being of sufficient duration to effect a tamping of the material in the mold and the other rest being longer to permit a third tamping, the top finishing and the removal of finished tiles and the return of the mold to operative position.

After a predetermined quantity of material has been charged into the mold box as hereinafter described, it is tamped or compacted by the tamping members which consist of a plurality of blocks 45 and shoes 46 detachably secured to the lower ends of the blocks. As shown in Fig. 4 the blocks 45 are slotted at their lower ends for the reception of the flat lifting bar 47, the ends of which extend through slots 48 in the vertical column 49 forming parts of the frame of the machine and preferably formed of channel bars, and the outer blocks of the series are provided with guide rollers 50 bearing against the edges of the vertical columns. The ends of the lifting bars are connected by pitmen 51 to the ends of lifting arms 52 having their opposite ends secured to hubs 53 loosely mounted on the shaft 9. As shown in Figs. 1 and 7, the arms 52 consist of flat bars between which are arranged rollers 54, said rollers being carried by pins 55 extending out through slots 56 in the bars and held in position within said slots by spring actuated bolts 57. These arms are actuated to lift the tamping blocks by cams 58, their downward movement being by gravity. It will be seen by reference to Fig. 1 that when the tamping blocks drop, the rollers 54 pass down along the radial surfaces of the cams and in order to prevent any retardation of the dropping of the tamping blocks, by reason of frictional contact of the rollers with such radial surfaces, the rollers are yieldingly mounted as hereinbefore described.

In order to prevent injurious shocks when the lifting bars are brought into contact with the ends of the slots in the tamping blocks, the lower ends of the pitmen 51 pass freely through blocks 59, carried between the bars forming the arms 52, and springs 60 are interposed between said blocks 59 and collars 61 on the pitmen. In case the tamping mechanism should operate when there is no material in the mold, the momentum of the blocks will be absorbed by the springs 60, and prevent injurious shocks to the lifting mechanism.

On the lower ends of the blocks 45, shoes 46 are detachably secured, each shoe consisting of transverse members 62 having a length equal to the distance between the side walls 2 of the mold box and a thickness equal to the distance between the end plates 4 or a partition 5, and the core. From these transverse members, ribs 63 extend a distance equal to half the widths of the cores. The shoes are so secured to the blocks as shown in Fig. 31 as to form openings through which the cores will pass when the tamping member is dropped, and also to form between adjacent pairs of shoes slots 64 into which the partitions will enter during the tamping operation. It is characteristic of the tamping that each member can drop independently of the other members, and hence even if the material should be distributed irregularly in the mold, all parts thereof will be uniformly compacted.

As shown in Fig. 1 the cams 58 employed for lifting the tamper is provided with four prongs or risers, $c$, $d$, $e$, and $f$, three of such prongs being so proportioned as regards their radial lengths that the tamper will always drop the same distance but as a quantity of material is charged into the mold box after each tamping, the prong $d$ made longer than the prong $c$ proportional to the quantity of material discharged into the mold by the second movement of the feed plate and the prong $e$ is made correspondingly longer than prong $d$. The prong $f$ which operates the tamper for the finishing of the tile is made shorter than the other prongs, as a lighter blow is required in finishing, as hereinafter described.

The upper surface of the tiles or those subjected to tamping will be more or less rough or irregular, and hence provision is made to remove such irregularities and form smooth surfaces. To this end the cores and end plates and partitions are made of a height a litle greater, e. g., one eighth of an inch higher than the finished tile, and as soon as the last charge has been tamped this extra height is reduced and a finished surface formed on the upper ends of the tiles. The means employed for this purpose are shown in Figs. 6 and 17 to 20$^a$. Following the third tamping operation, a plate 65 slidably supported by the end plates 4 is moved forward over the mold box. The finishing plate is provided at its front end with a scraping blade 66 which projects at least one-eighth of an inch below the under surface of the plate 65 and rides on the end plates and partitions 5 in the forward movement of the finishing plate. In its forward movement the blade will scrape off all surplus material extending above the upper edges of the end plates, partitions and cores. On the underside of the finishing plate is secured a liner 67 formed of a sheet of steel having such longitudinal and transverse dimensions that it will pass into the mold box and also having portions cut away corresponding to the positions of the cores and partitions, as shown in Fig. 20$^a$. At the end of the forward movement of the plate 65 the blade will drop off the ends of the end plates 4 and in front of the front side of the mold box, and the liner 67 will rest on the upper surface of the material in the mold box. As soon as the plate and liner have reached this position, the tamper drops onto the plate 65 forcing the liner down in the spaces occupied by the material producing a smooth finished surface thereon. As hereinbefore stated, the liners 67 pass within the mold and as shown in Fig. 20$^a$ the plate to which the liners are secured extend beyond the liners and will, when the plate is struck by the tamper, be forced down on top of the upper edges of the mold box so that these plates and the liners will determine the height of the finished tile.

The plate 65 is provided at its rear end with lugs 68 which project laterally and rest upon guide plates 68$^a$ on the frame of the machine and are connected to levers 69 by pitmen 70. The levers 69 are pivotally mounted on the shaft 9 and are provided with extensions 71 carrying rollers contacting with cams 72 on the shaft 12. These cams will effect the forward movement of the plate, its rearward movement being effected by the end plates 4 which have blocks 73 so located that as the end plates move rearwardly, these blocks will strike against laterally projecting lugs 68. It will be understood that the mold box will be given an initial downward stripping movement before the withdrawal of the end plates, partitions, and finishing plate.

Figure 22:
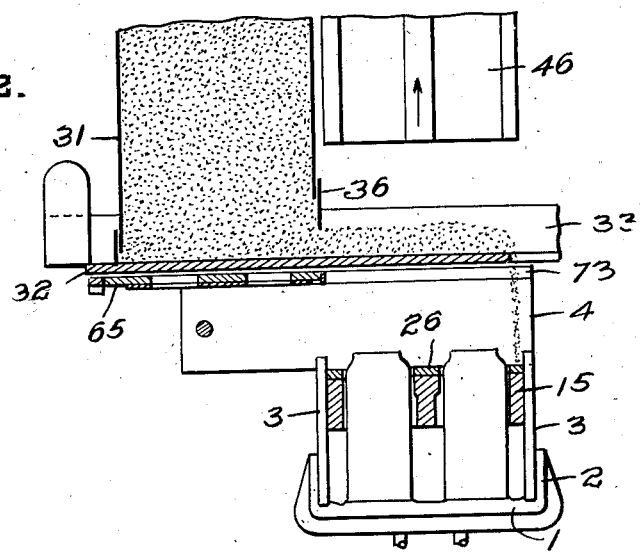
Figure 23:
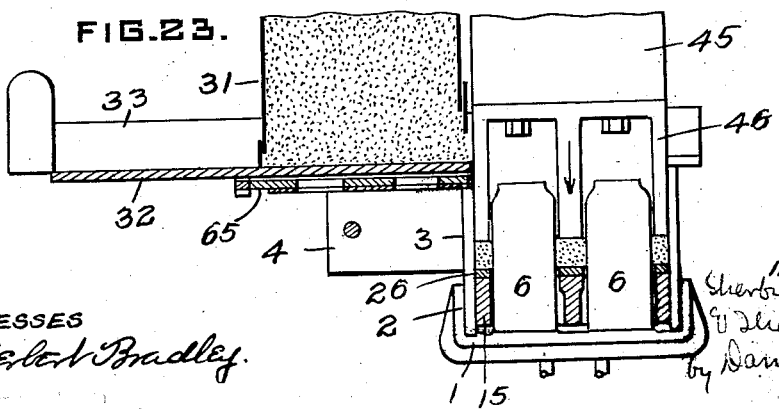
Figure 24:
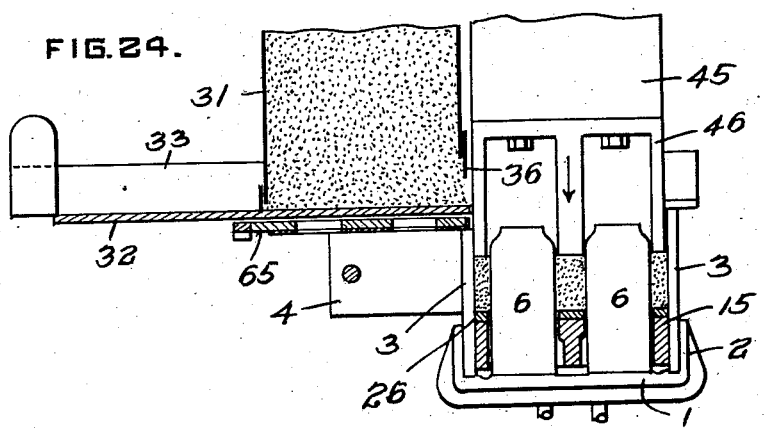
Figure 25:
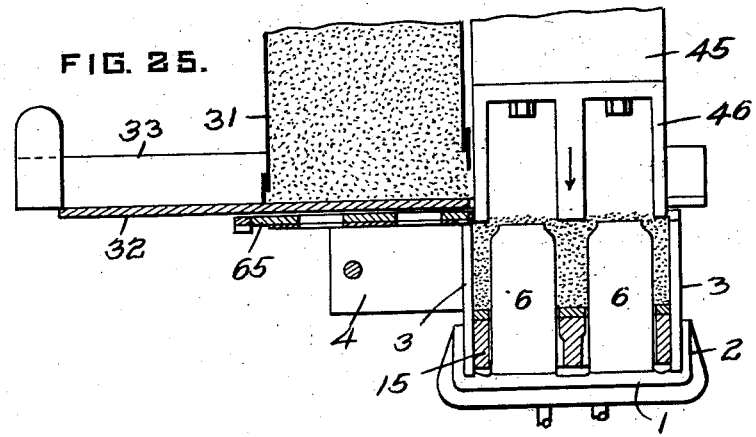
Figure 26:
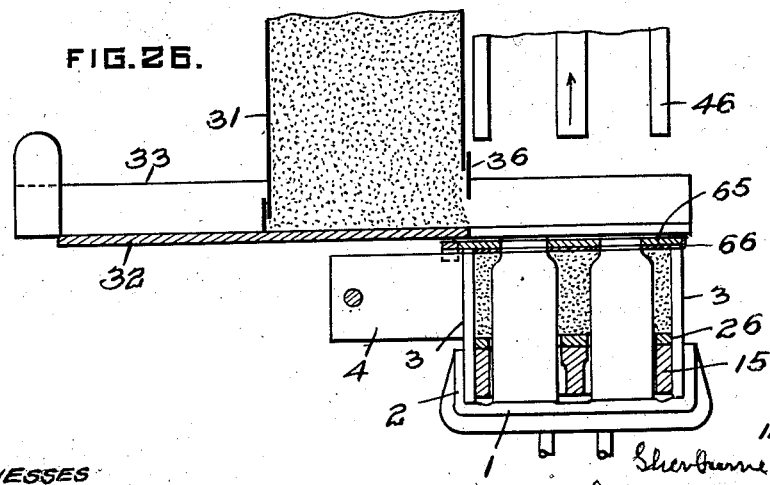
Figure 27:
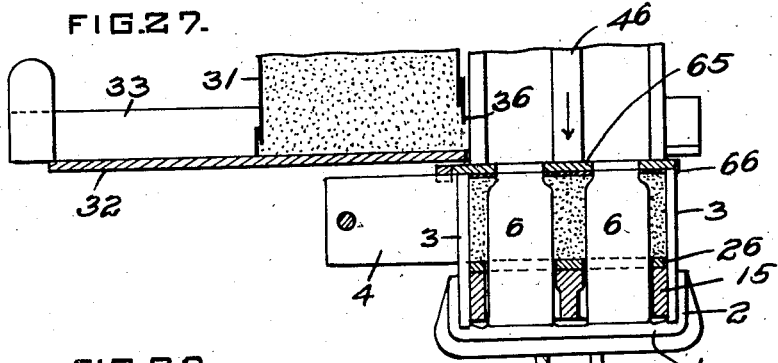
Figure 28:
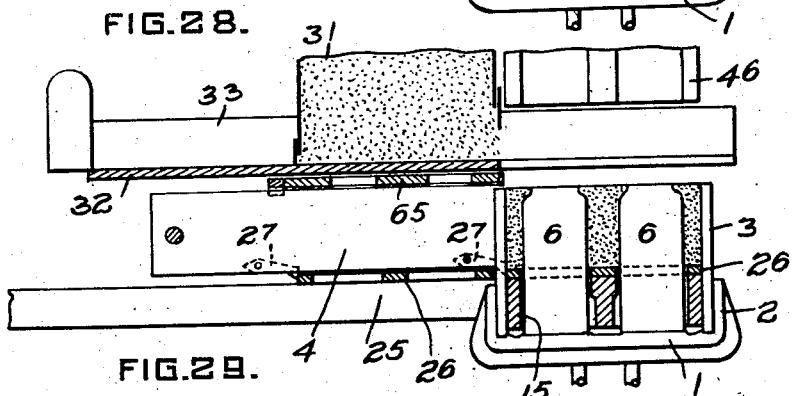
Figure 29:
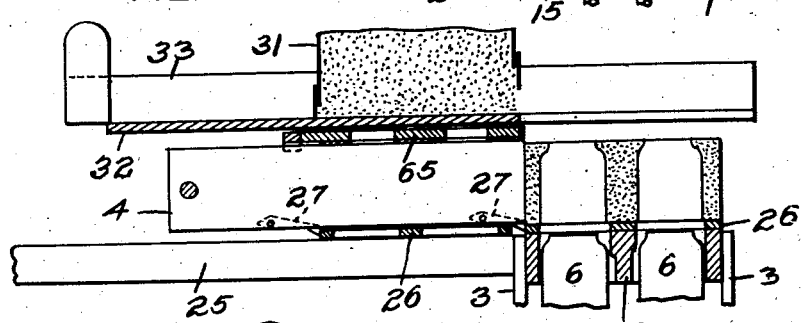
Figure 30:
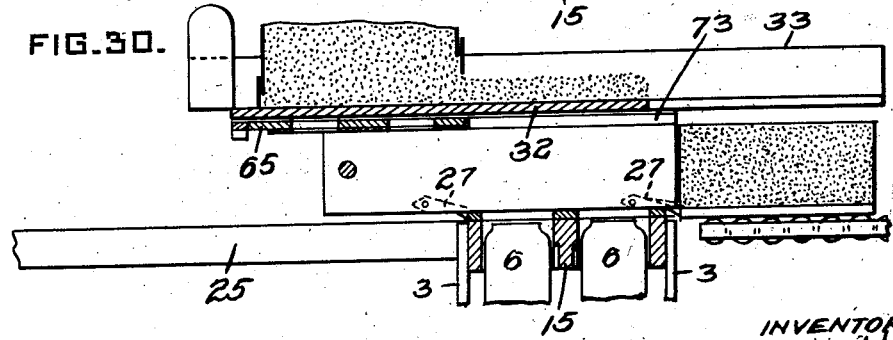

The successive steps by which a tile is made is clearly illustrated in Figs. 21 to 30 inclusive. In Fig. 21 the mold box is shown in its lowered position, the pallet resting upon the anvil 15, the plates 4 and partitions 5 moving forward, the feed plate 32 moving forward carrying the material to be deposited in the mold and the tampers moving upward. In Fig. 22 the mold is being raised and the feed plate 32 moving backward so that the material is shown dropping off the end into the mold. In Fig. 23 the feed plate has been entirely withdrawn, the mold entirely raised, and the tampers are down, having imparted the first tamping blow. In Fig. 24 additional material has been added to the mold by reciprocation of the feed plate and the tampers have imparted their second blow. In Fig. 25 the feed plate has moved forward a third time and has been withdrawn and the tampers have imparted their third or last blow and are shown resting on the material in the mold. It will be observed that in Fig. 25 material is shown projecting over the several sides of the mold, the upper edges of the end plates, and partitions, and the tops of the cores. This is due to the displacement effected by the dropping of the tampers. In Fig. 26 the tampers have been raised and the finishing plate 65 been moved forward, the scraper 66 having removed all surplus material and the liner on the underside of the plate is resting on the material in the mold. In Fig. 27 the tampers have dropped onto the finishing plate and the liners are shown as being forced a short distance into the top of the mold so as to compact whatever material has been disturbed by the last tamping operation, and effecting a smoothing and finishing of the top surface of the tile. In Fig. 28 the tampers have been raised, the end plates 4, partitions 5 and finishing plates 65 have been withdrawn and the pallet carrying a block is about to be moved forward. In Fig. 29 the mold and its cores are shown lowered and stripped from the finished material which is resting on the pallet on which it is formed. The dogs 27 at the front end of the end plates 4 are engaging the rear edges of the pallet on which the tiles were formed and the second dog is in engagement with the rear edge of an adjacent pallet. In Fig. 30 the end plates have been advanced, pushing a finished article out of the machine onto a feed table or support and a second pallet has been advanced into operative position and the feed plate has nearly completed its forward movement for charging a quantity into the mold, as hereinbefore described.

The movements of the end plates and partitions prior to the stripping movement of the front and back walls of the mold, are an important feature of the improvement claimed herein. In the tamping operation the material is forced into close contact with the inner surfaces of the end and side walls of the mold, and with both sides of the partition and on all sides of the cores, and hence care must be taken in separating these several elements from the block to avoid injury to the block. During the withdrawal of the end walls and partitions, the rear side wall will act as an abutment holding the material from displacement by the end walls and partitions. The removal of these parts will permit of a relief of the compressive stresses in the block especially of the gripping action on the cores, and thus facilitate the removal of the cores and side walls.

It will be observed that the several walls of the mold, the cores, and the partitions are so withdrawn from the block as to have a wiping or troweling action on the surfaces in contact with such block, thereby producing a smooth finished surface.

It is characteristic of the improvement herein claimed that the materials are charged incrementally into the mold and that each increment receives the same compacting blow or pressure, the drop of the tampers being varied as hereinbefore described, as the material rises in the mold with each new charge. It will be noted that tiles are completed at each revolution of the power shaft. While the machine shown herein is adapted for the formation of three tiles, it will be readily understood by those skilled in the art that by properly constructing and proportioning the machine, any number of tiles may be made, from one upward.

It is also characteristic of the improvement claimed herein that the movements of all parts of the machine are effected by cams secured on the same shaft, and that all such parts are positively effected except the downward movement of the tampers.

We claim herein as our invention:

1. In a machine for forming hollow tiles, blocks, etc. the combination of a mold consisting of independently movable sides and end members, a core arranged therein, means for feeding the entire quantity of plastic material into the mold in successive fractional parts, means operative after each feeding operation for tamping the material, means for imparting a finish to the surface operated on by the tampers and means for simultaneously removing the core and side members downwardly from the formed block.

2. In a machine for forming blocks, tiles, etc., the combination of a mold consisting of independently movable sides and end members, a partition adapted to divide the mold into a plurality of compartments, cores extending into the several compartments of the mold, means for feeding material in fractional quantities into the compartments, means for tamping the material subsequent to each feeding operation, means for withdrawing the partitions, means for removing the core and side members from the finished article at an angle to the direction of movement of the partition.

3. In a machine for forming hollow tiles, blocks, etc. the combination of a mold consisting of independently movable sides and end members, a partition adapted to divide the mold into a plurality of compartments, cores extending into the several compartments of the mold, means for feeding material in fractional quantities into the compartments, means for tamping the material subsequent to each feeding operation, means for finishing or smoothing the side of the block subjected to the tampers, means for withdrawing the partitions, means for removing the side members of the mold and the cores subsequent to the withdrawal of the partition and in a direction at an angle to the movement of the partition.

4. In a machine for forming bricks, tile, etc. the combination of a mold having side walls, means for moving said mold vertically, movable plates adapted to form the end walls of the mold, a platen arranged within the mold, means for supporting the platen independent of the mold, means for shifting the end plates, means for feeding material to the mold and means for tamping such material.

5. In a machine for forming bricks, tile, etc. the combination of a mold having side and end walls and a platen, the latter forming the bottom of the mold, said side and end walls being movable independent of each other and of the platen, means extending beyond the planes of movement of the end walls of the mold for supporting the platen and means for shifting the side and end walls independent of the platen in directions at an angle to each other.

6. In a machine for forming bricks, tile, etc., the combination of a mold consisting of side and end walls and a platen, the ends of the platen projecting beyond the planes of movement of the end walls, means for supporting the platen independent of the mold and means for shifting the mold box, moving the side walls and end walls of the mold with reference to the platen.

7. In a machine for forming bricks, tile, etc., the combination of a mold consisting of side and end walls and a platen, the latter forming the bottom of the mold and the side and end walls being movable independent of the platen, means independent of the mold for supporting the platen during the formation of an article thereon and means for shifting the side and end walls with reference to the platen and its support, the directions of movement of the side and end walls being at an angle one to the other.

8. In a machine for forming bricks, tile, etc. the combination of a mold, means for feeding material into the mold, means for tamping the material in the mold, a finishing plate and means for shifting said plate on the compacted material.

9. In a machine for forming tile, bricks, etc. the combination of a mold, means for feeding material into the mold in quantities less than that required to form the article, said feeding means being constructed to effect a plurality of feeding operations during each revolution of the machine, tampers and means for lifting the tampers intermediate the feeding operations, each lift being higher than the preceding one.

10. In a machine for forming tile, bricks, etc. the combination of an open ended mold box, movable end plates, a stationary pallet support arranged within the mold, a pallet platform and means operative by the end plates for shifting the pallet to and from the pallet support.

11. In a machine for forming tiles, bricks, etc. the combination of a mold, means for feeding material to the mold, a plurality of tamping blocks provided with slots, a bar extending through said slots, said slots having a length greater than the transverse dimensions of the bar and means for raising the bar.

12. In a machine for forming tiles, blocks, etc. the combination of a mold, means for feeding material to the mold, a plurality of tamping blocks provided with slots, a bar extending through said slots said slots having a length greater than the transverse dimensions of the bar and a cam having a plurality of spaced risers differing in their radial heights.

13. In a machine for forming bricks, tiles, etc. the combination of a mold consisting of independent side and end walls and platen, partitions arranged in said mold, means for tamping such material, means for withdrawing the partitions in a direction at an angle to the line of movement of the tamping means, and means for shifting the side walls of the mold in a direction parallel with the movement of the tampers.

14. A machine for forming blocks, tiles, etc. having in combination a mold consisting of independently movable side walls and end walls, partitions extending across the mold, means for tamping material in the mold, means for shifting the end walls and partitions in a direction at an angle to the direction of movement of the tampers and means for shifting the side walls in a direction substantially parallel with the movement of the tampers.

15. In a machine for forming bricks, tiles, etc., the combination of a mold, means for feeding material into the mold, means for tamping the material in the mold, a finishing plate provided with a scraping blade, means for shifting said plate onto the compacted material.

16. In a machine for forming blocks, tiles, etc., the combination of a mold, gravity tampers, a lever connected to the tampers and a cam for operating said lever, said cam having portions of its periphery substantially radial the ends of the radial portions being connected by surfaces forming arcs of gradual increasing radii, the several points of junction of the radial and curved surfaces being at different distances from the axis of rotation of the cam whereby the tampers are raised at successively greater distances and whereby the tampers are permitted to drop freely and the cam will effect the upward movement of the tampers without material shock or blow.

In testimony whereof we have hereunto set our hands this 18th and 25th days of May, 1922, respectively.

SHERBURNE H. WIGHTMAN.
THOMAS A. LONG.